United States Patent
Sorkin et al.

(10) Patent No.: US 11,444,561 B2
(45) Date of Patent: Sep. 13, 2022

(54) GENERATOR CONTROL USING TRANSIENT CONDITION RESILIENT RIPPLE BLENDER

(71) Applicant: Safran Power USA, LLC, Twinsburg, OH (US)

(72) Inventors: Lev Sorkin, Cranford, NJ (US); Manali S. Patil, Tinton Falls, NJ (US)

(73) Assignee: Safran Power USA, LLC, Twinsburg, OH (US)

( * ) Notice: Subject to any disclaimer, the term of this patent is extended or adjusted under 35 U.S.C. 154(b) by 0 days.

(21) Appl. No.: 17/276,149

(22) PCT Filed: Sep. 20, 2018

(86) PCT No.: PCT/US2018/051998
§ 371 (c)(1),
(2) Date: Mar. 14, 2021

(87) PCT Pub. No.: WO2020/160557
PCT Pub. Date: Mar. 26, 2020

(65) Prior Publication Data
US 2022/0038037 A1    Feb. 3, 2022

(51) Int. Cl.
*H02P 9/00* (2006.01)
*H02P 9/10* (2006.01)
*H02P 9/30* (2006.01)
*H02P 101/30* (2015.01)

(52) U.S. Cl.
CPC .............. *H02P 9/102* (2013.01); *H02P 9/305* (2013.01); *H02P 2101/30* (2015.01)

(58) Field of Classification Search
CPC ....... H02P 9/102; H02P 9/305; H02P 2101/30
See application file for complete search history.

(56) References Cited

U.S. PATENT DOCUMENTS

| 4,340,849 A | 7/1982 | Kuhn |
| 4,415,848 A | 11/1983 | Morishita |
| 4,831,322 A * | 5/1989 | Mashino ............... H02J 7/2434 322/60 |

(Continued)

FOREIGN PATENT DOCUMENTS

CN    2560152 Y    7/2003

OTHER PUBLICATIONS

International Patent Application No. PCT/US2018/051998, International Search Report and Written Opinion, dated May 16, 2019.

*Primary Examiner* — Julio G. Gonzalez
(74) *Attorney, Agent, or Firm* — Kilpatrick Townsend & Stockton LLP

(57) ABSTRACT

Described is a system that includes a polyphase generator and a polyphase bridge rectifier electrically coupled to an output of the polyphase generator. The polyphase bridge rectifier may output a positive rectified ripple signal and a negative rectified ripple signal, and the positive rectified ripple signal and the negative rectified ripple signal may be summed to produce a total ripple signal. Further, the system may include a generator regulation feedback control loop that regulates the output of the polyphase generator with a field control signal. In an embodiment, the field control signal is based on summing the total ripple signal and a reference voltage.

20 Claims, 4 Drawing Sheets

(56) References Cited

U.S. PATENT DOCUMENTS

| | | | | |
|---|---|---|---|---|
| 4,860,185 A | * | 8/1989 | Brewer | G06F 1/28 |
| | | | | 307/66 |
| 5,502,368 A | * | 3/1996 | Syverson | H02J 7/28 |
| | | | | 322/29 |
| 2003/0043607 A1 | * | 3/2003 | Vinciarelli | H02M 1/4208 |
| | | | | 363/61 |

* cited by examiner

GENERATOR CONTROL USING TRANSIENT CONDITION RESILIENT RIPPLE BLENDER

TECHNICAL FIELD

The field of the present disclosure relates to generator control circuitry. More specifically, the present disclosure relates to a transient condition resilient ripple blender used to control an output of a polyphase generator.

BACKGROUND

For electrical power generation, a generator may be regulated by a pulse width modulated (PWM) control signal in response to a feedback signal that is based on the output of the generator. The output of the generator, and thus the feedback signals used to regulate the output, may be susceptible to transient conditions experienced by the generator. Such transient conditions may cause a change in a voltage, current, or both of an output of a generator. Due to the changes of the output of the generator, the PWM control signal used to regulate the generator may also experience distortion as a result of transient conditions. Such distortion of the PWM control signal may cause false voltage compensation that results in an undesired increase or decrease in output voltage regulation. Further, the distortion of the PWM control signal may result in unnecessary complication of fault detection and protection circuits associated with the generator.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the subject matter covered by this patent are defined by the claims below, not this summary. This summary is a high-level overview of various aspects of the subject matter of the present disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a system may include a polyphase generator and a polyphase bridge rectifier electrically coupled to an output of the polyphase generator. The polyphase bridge rectifier may output a positive rectified ripple signal and a negative rectified ripple signal, which may be summed to produce a total ripple signal. The system may also include a generator regulation feedback loop that regulates the output of the polyphase generator with a field control signal. The field control signal may be based on summing the total ripple signal and a reference voltage.

According to certain embodiments of the present disclosure, a method may include providing an output of a polyphase generator to a polyphase bridge rectifier. The method may also include outputting from the polyphase bridge rectifier a positive rectified ripple signal and a negative rectified ripple signal. Further, the method may include summing the positive rectified ripple signal and the negative rectified ripple signal to produce a total ripple signal. Additionally, the method may include generating a field control signal based on summing the total ripple signal and a reference voltage and regulating the output of the polyphase generator with the field control signal.

According to certain embodiments of the present disclosure, a system may include a polyphase generator and a polyphase bridge rectifier electrically coupled to an output of the polyphase generator. In an embodiment, the polyphase bridge rectifier outputs a positive rectified ripple signal and a negative rectified ripple signal. The system may also include a first conditioning filter that filters the positive rectified ripple signal to output a filtered positive rectified ripple signal and a second conditioning filter that filters the negative rectified ripple signal to output a filtered negative rectified ripple signal. The filtered positive rectified ripple signal and the filtered negative rectified ripple signal may summed to output a differential ripple signal. Additionally, the system may include regulator that controls the output of the polyphase generator with a field control signal based on summing of the differential ripple signal and a reference voltage.

DETAILED DESCRIPTION

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and examples of the disclosure relate to a transient condition resilient ripple blender ("ripple blender") used to control operation of a polyphase generator. The polyphase generator may be used to generate electrical power used in aircraft electrical systems. Control of the polyphase generator may be affected by transient conditions experienced by the polyphase generator. For example, a regulator of a polyphase generator may rely on feedback signals produced from an output of the polyphase generator and used to provide control signals to the generator. Should the feedback signals be sensitive to transient conditions of the polyphase generator, the regulator may provide distorted control signals to the polyphase generator resulting in a further distorted output. As used herein, the term "transient condition" may refer to any condition that results in a change in a steady-state condition of voltage, current, or both of an output of a generator.

To avoid the effects of transient conditions on the control of the polyphase generator, the ripple blender described below with respect to FIG. 1 outputs a differential ripple between positive and negative outputs of a bridge rectifier. The differential ripple negates the effects of the transient conditions, and is provided to the regulator of the polyphase generator as the feedback signal. By avoiding effects of transient conditions on the feedback signal, adverse effects of the transient condition on the control of the generator may also be avoided.

The described embodiments provide a ripple blender used in a generator control system. While the ripple blender and the generator control system are discussed for use in an aircraft, it is by no means so limited. Rather, embodiments of the ripple blender and the generator control system may be used in power generation systems of any type or otherwise as desired.

Figure 1:
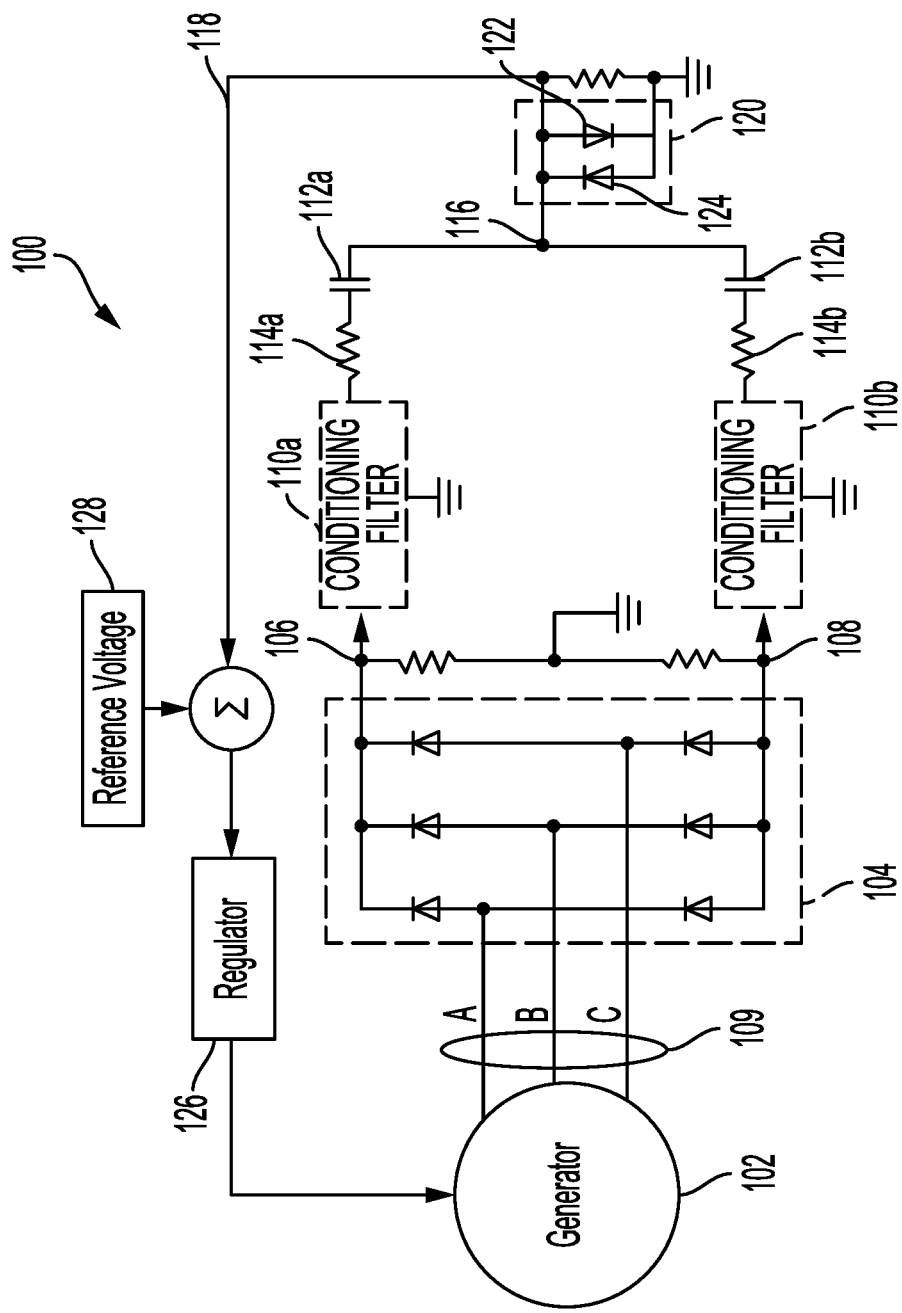
FIG. 1 is a schematic diagram of a transient condition resilient ripple blender circuit, according to certain embodiments of the present disclosure.

FIG. 1 is a schematic diagram of a transient condition resilient ripple blender circuit ("ripple blender circuit") 100. The ripple blender circuit 100 includes a polyphase generator 102. The polyphase generator 102 is depicted as a three-phase generator, however, the polyphase generator 102 may include more or fewer phases. The polyphase generator 102 outputs voltage signals of each phase of the polyphase generator 102 to a full-wave bridge rectifier 104 (e.g., a polyphase bridge rectifier). The full-wave bridge rectifier 104 rectifies the voltage signals output by the polyphase generator 102 and provides a positive rectified ripple signal at node 106 and a negative rectified ripple signal at node 108.

In an example, a transient condition experienced at the polyphase generator 102 may result in a change in a steady-state condition of voltage, current, or both at an output 109 of the polyphase generator 102. The positive rectified ripple signal and the negative rectified ripple signal output at the nodes 106 and 108, respectively, may each be influenced by the transient conditions experienced at the polyphase generator 102. That is, the transient condition experienced at the polyphase generator 102 may result in an abnormal output of the positive rectified ripple signal and the negative rectified ripple signal.

In an example, the positive rectified ripple signal and the negative rectified ripple signal may be provided to a conditioning filter 110a and a conditioning filter 110b, respectively. The conditioning filters 110a and 110b may be simple filters that remove noise from the positive rectified ripple signal and the negative rectified ripple signal. The conditioning filters 110a and 110b may be band pass filters that are tuned to pass the positive rectified ripple signal and the negative rectified ripple signal while blocking any noise of a frequency greater or less than the band pass range. Other filter types are also contemplated for use as the conditioning filters 110a and 110b. For example, the conditioning filters 110a and 110b may also be low pass filters or high pass filters depending on an expected frequency of a voltage ripple associated with the positive rectified ripple signal and the negative rectified ripple signal.

The filtered positive rectified ripple signal and negative rectified ripple signal may be provided to decoupling capacitors 112a and 112b in series with resistors 114a and 114b, respectively, prior to combining at node 116. The decoupling capacitors 112a and 112b are used to decouple the full-wave bridge rectifier 104 from a feedback control loop 118. For example, noise caused by circuit components associated with the full-wave bridge rectifier 104 and the conditioning filters 110a and 110b may be removed using the decoupling capacitors 112a and 112b, which reduces any effects of the noise on the feedback control loop 118.

At the node 116, the filtered positive rectified ripple signal and the filtered negative rectified ripple signal are added together to output a differential ripple signal (i.e., a total ripple signal) on the feedback control loop 118. In an example, a pair of diodes 120 provide a ripple limiting function that limits a voltage output of the differential ripple to voltages between threshold voltages of the pair of diodes 120. For example, when the differential ripple has a voltage greater than a threshold voltage of a forward biased diode 122, the forward biased diode 122 is activated and the differential ripple voltage is pulled down to the threshold voltage of the forward biased diode 122. Similarly, when the differential ripple has a negative voltage less than a threshold voltage of the reverse biased diode 124, the reverse biased diode 124 is activated and the differential ripple voltage is pulled up to a negative threshold voltage of the reverse biased diode 124.

To achieve a stable regulated output at the polyphase generator 102, a pulse width modulated (PWM) control signal from a regulator 126 may control the output of the polyphase generator 102. For the regulated output of the polyphase generator 102 to remain stable, a frequency of the PWM control signal may be proportional to a frequency of the output 109 of the polyphase generator 102. Accordingly, the differential ripple, via the feedback control loop 118, is combined with a reference voltage 128 to provide a frequency proportional to the frequency of the output of the polyphase generator 102 for use by the regulator 126. The regulator 126 may use the frequency of the differential ripple to generate the PWM control signals at the appropriate frequency for control of the polyphase generator 102. A combination of the feedback control loop 118 and the regulator 126 may collectively be referred to as a generator regulation feedback loop.

Further, because the differential ripple on the feedback control loop 118 is a combination of the positive rectified ripple signal and negative rectified ripple signal, the differential ripple, and thus the PWM control signals, are unaffected by transient conditions of the polyphase generator 102. For example, combining the positive rectified ripple signal with the negative rectified ripple signal results in the differential signal that peaks and troughs above and below ground, respectively, in a stable manner (e.g., without skipping a wave period). Thus, the differential ripple provided to the feedback control loop 118 maintains a constant frequency for use by the regulator 126. In contrast, the positive rectified ripple signal and the negative rectified ripple signal may include peaks or troughs during a transient condition that are too low or too high to be registered by a regulator voltage control loop as a transition to a new half cycle of the positive or negative rectified ripple signals. When the regulator voltage control loop misses such a transition, the frequency of the PWM control signal generated by the regulator 126 may be distorted resulting in false voltage compensation of the polyphase generator 102.

In an example, the regulator 126 may control the PWM control signals provided to the polyphase generator 102 by switching a field metal-oxide-semiconductor field-effect transistor (MOSFET) (not shown) between an "on" state and an "off" state. The field MOSFET may provide field current to the polyphase generator 102 that is directly related to a voltage output by the polyphase generator 102. Controlling the field MOSFET in the "on" state and "off" state in accordance with the PWM control signal proportional to an output frequency of the polyphase generator 102 provides stable operation of the polyphase generator 102. In one or more examples, the field MOSFET may include any other suitable semiconductor switching device capable of providing the field current to the polyphase generator 102 based on the PWM control signals.

Figure 2:
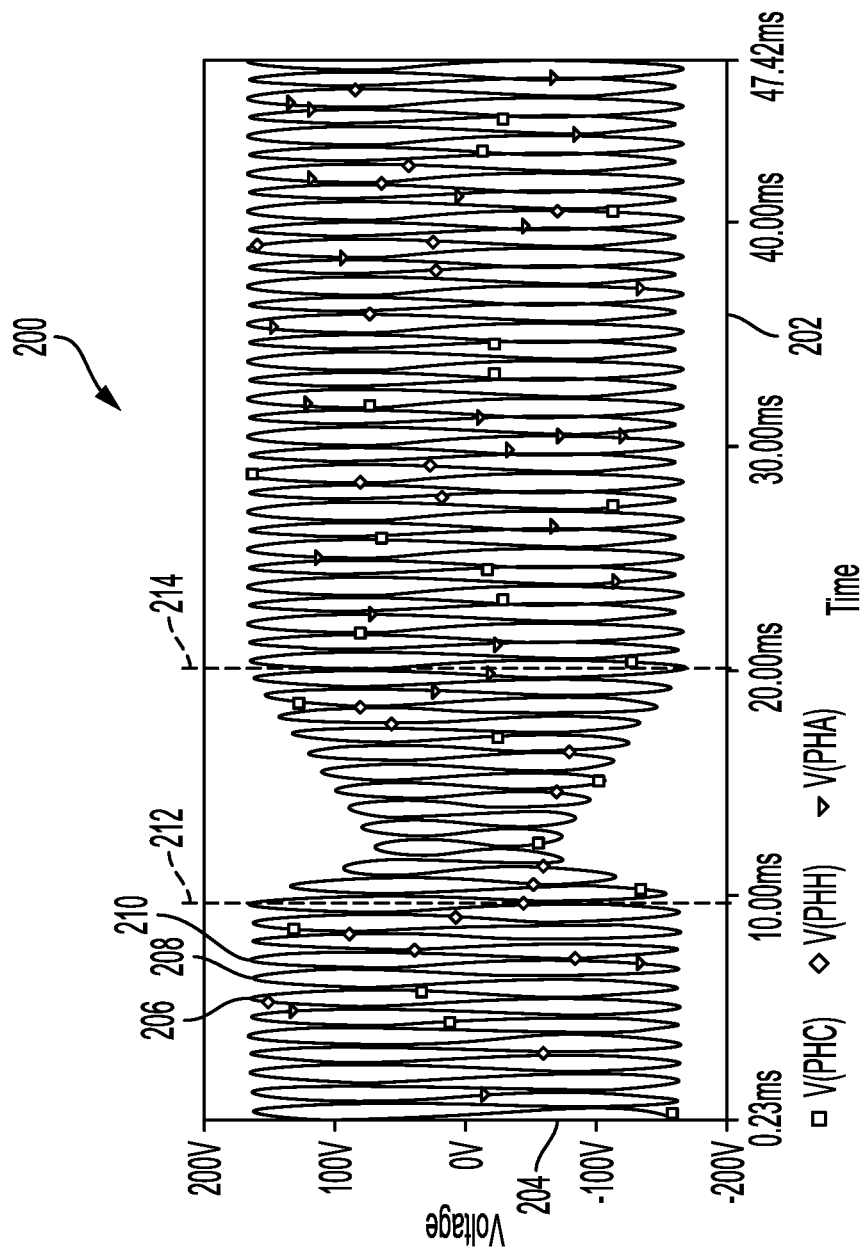
FIG. 2 is a graphical representation of a voltage output over time of a three-phase generator experiencing a transient condition, according to certain embodiments of the present disclosure.

FIG. 2 is a graphical representation 200 of a voltage output over time from a three-phase generator (e.g., the polyphase generator 102) experiencing a transient condition. The graphical representation 200 includes an abscissa 202 representing elapsed time and an ordinate 204 representing a voltage magnitude output by the three-phases of the polyphase generator 102. Lines 206, 208, and 210 represent a first phase, a second phase, and a third phase of the voltage magnitude output of the polyphase generator 102, respectively.

As mentioned above, a transient condition may be defined as any condition that results in a change in a steady-state condition of voltage, current, or both of an output of the polyphase generator 102. As depicted in the graphical representation 200, a transient condition occurs for approximately 10 ms between lines 212 and 214. Using the ripple blender circuit 100 described above, effects of the transient condition on control of the polyphase generator 102 may be limited.

Figure 3:
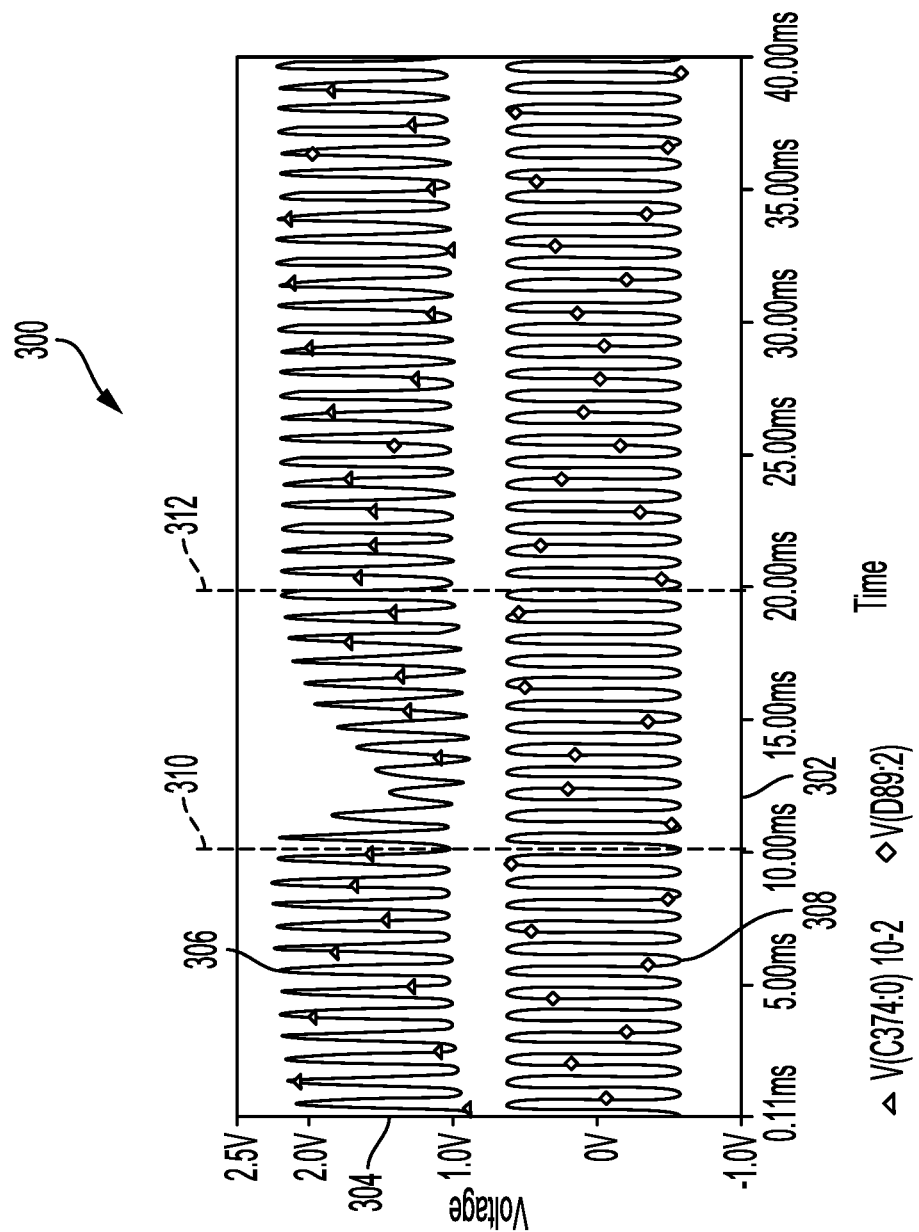
FIG. 3 is a graphical representation of a voltage output over time of a positive ripple of a rectified output of a polyphase generator and a blended output of the rectified output of the polyphase generator, according to certain embodiments of the present disclosure.

FIG. 3 is a graphical representation 300 of a voltage output over time of a positive ripple of a rectified output of a polyphase generator (e.g., a positive rectified ripple signal) and a blended output of the rectified output of the polyphase generator (e.g., a differential ripple signal combination of the positive rectified ripple signal and a negative rectified ripple signal). The graphical representation 300 includes an abscissa 302 representing elapsed time and an ordinate 304 representing a voltage magnitude value of the signals displayed in the graphical representation 300. As illustrated, line 306 may represent the positive rectified ripple signal of the polyphase generator 102, and line 308 may represent the differential ripple signal between the positive rectified ripple signal and a negative rectified ripple signal of the polyphase generator 102.

The positive rectified ripple signal of line 306 and the differential ripple signal of line 308 each result from the three-phase voltage output of the polyphase generator 102 depicted in the graphical representation 200 of FIG. 2. For example, the positive rectified ripple signal of line 306 represents a positive-side rectified signal of the three-phase voltage output by the polyphase generator 102. With reference to FIG. 1, the positive rectified ripple signal of line 306 may be measured at the node 106 of the ripple blender circuit 100. The differential ripple signal of line 308 represents a combination of the positive rectified ripple signal and a negative rectified ripple signal. With reference to FIG. 1, the differential ripple signal of line 308 may be measured at the node 116 of the ripple blender circuit 100.

As in the graphical representation 200, the graphical representation 300 depicts a transient condition that occurs for approximately 10 ms between lines 310 and 312. The transient condition is evident by a change in a steady-state condition of the positive rectified ripple signal of line 306. As discussed above with respect to FIG. 1, the change in the steady-state condition of the positive rectified ripple signal may result in generation of a distorted PWM signal by the regulator 126 should the positive rectified ripple signal be fed to the feedback control loop 118. In contrast, the transient condition has a much smaller effect on the differential ripple signal of line 308. Thus, the use of the differential ripple signal on the feedback control loop 118 of the ripple blender circuit 100 may limit effects of the transient condition on control of the polyphase generator 102 by the regulator 126.

Figure 4:
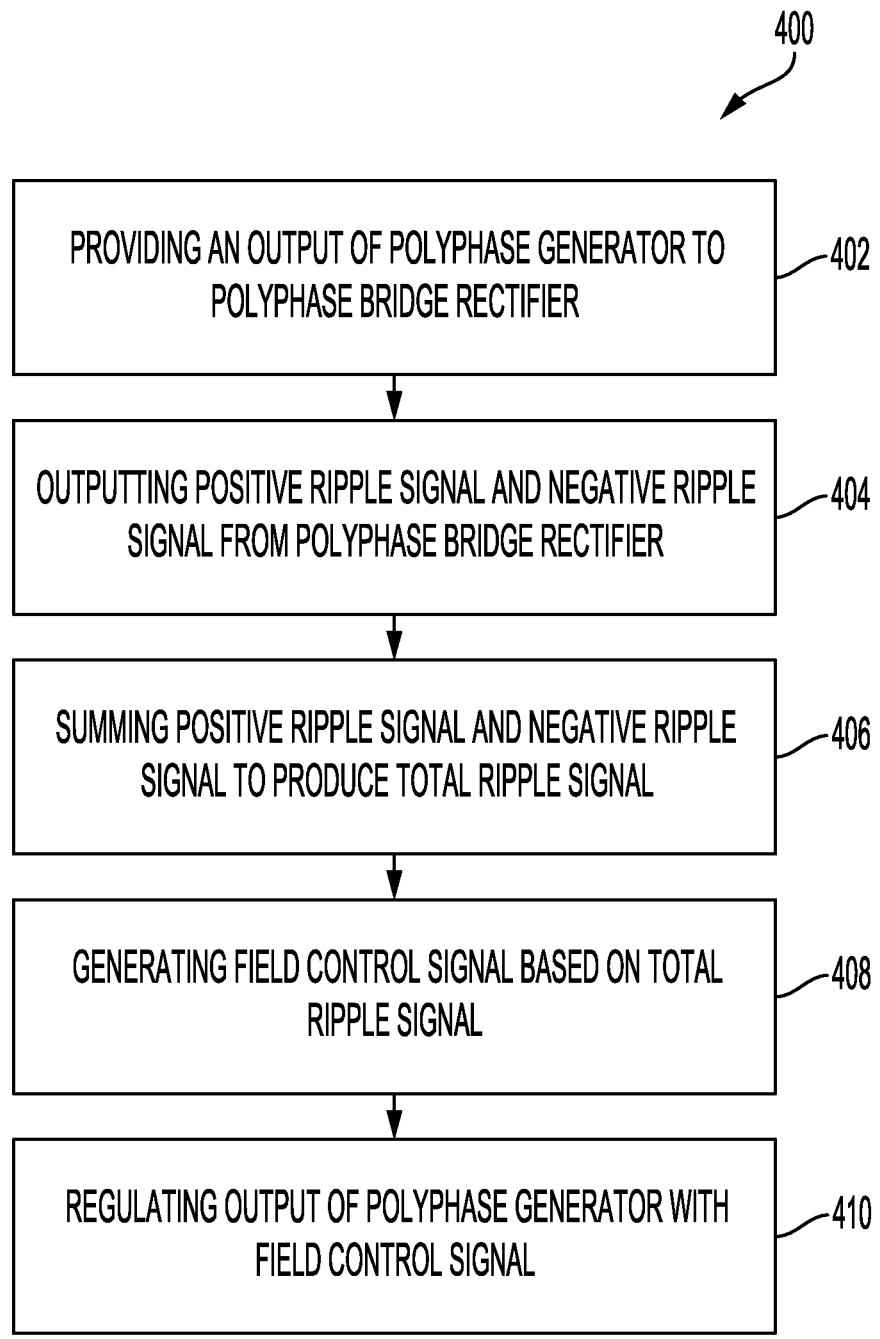
FIG. 4 is a flow chart of a process for regulating an output of a polyphase generator using the transient condition resilient ripple blender circuit of FIG. 1, according to certain embodiments of the present disclosure.

FIG. 4 is a flow chart of a process 400 for regulating an output of the polyphase generator 102 using the ripple blender circuit 100. As discussed above, the output of the polyphase generator 102 may be regulated by the regulator 126 using a PWM control signal. To maintain a stable regulated output signal of the polyphase generator 102, the PWM control signal may include a frequency that is proportional to a frequency of the output of the polyphase generator 102. To avoid effects of transient conditions experienced by the polyphase generator 102 on the regulation of the polyphase generator 102, the ripple blender circuit 100 provides the differential ripple signal to the feedback control loop 118 used to regulate the generator 102.

At block 402, the process 400 involves providing an output of the polyphase generator 102 to a polyphase bridge rectifier (e.g., the full-wave bridge rectifier 104). The full-wave bridge rectifier 104 rectifies the polyphase output of the polyphase generator 102 to a positive rectified ripple signal and a negative rectified ripple signal. Such signals may be noisy and are susceptible to distortion resulting from transient conditions experienced by the polyphase generator 102.

At block 404, the process 400 involves outputting the positive rectified ripple signal and the negative rectified ripple signal from the full-wave bridge rectifier 104. In an example, the positive and negative rectified ripple signals may be provided to the conditioning filters 110a and 110b, respectively, to remove noise from the signals. Additionally, the positive and negative rectified ripple signals may be provided to the decoupling capacitors 112a and 112b to decouple the signals from potentially noisy circuitry of the full-wave bridge rectifier 104.

At block 406, the process 400 involves summing the positive rectified ripple signal and the negative rectified ripple signal. Summing the positive rectified ripple signal and the negative rectified ripple signal involves directing the two signals to a single node (e.g., the node 116) within the ripple blender circuit 100. The result of summing the positive rectified ripple signal and the negative rectified ripple signal is a total ripple signal (e.g., the differential ripple signal). The total ripple signal is provided from the node 116 to the feedback control loop 118, and the total ripple signal is not susceptible to distortion from transient conditions experienced by the polyphase generator 102. Because the total ripple signal is not susceptible to distortion from transient conditions, effects of the transient conditions on regulation of the output of the polyphase generator 102 based on the total ripple signal is limited.

At block 408, the process 400 involves generating a field control signal based on the total ripple signal. The field control signal may be a PWM control signal used to control an output of the polyphase generator 102. The PWM control signal may be generated by the regulator 126. For example, the regulator 126 may control a duty cycle of the PWM control signal by transitioning a field MOSFET between an "on" state and an "off" state. Further, the regulator 126 may use a frequency of the total ripple signal to control a frequency of the PWM control signal to a frequency proportional to an output frequency of the polyphase generator 102.

Thus, at block 410, the process 400 involves regulating the output of the polyphase generator 102 with the field control signal. Because the field control signal uses a frequency of the total ripple signal, the polyphase generator 102 may be regulated by the field control signal with a frequency that is proportional to the frequency of the total ripple signal to achieve a stable regulated output by the polyphase generator 102. Further, because the total ripple signal is not susceptible to transient conditions experienced by the polyphase generator 102, distortion of the field control signal based on feedback to the regulator 126 affected by transient conditions is avoided.

In the following, further examples are described to facilitate the understanding of the subject matter of the present disclosure:

As used below, any reference to a series of examples is to be understood as a reference to each of those examples disjunctively (e.g., "Examples 1-4" is to be understood as "Examples 1, 2, 3, or 4").

Example 1 is a system, comprising: a polyphase generator; a polyphase bridge rectifier electrically coupled to an output of the polyphase generator, wherein the polyphase bridge rectifier is configured to output a positive rectified ripple signal and a negative rectified ripple signal, wherein the positive rectified ripple signal and the negative rectified ripple signal are summed to produce a total ripple signal; and a generator regulation feedback loop configured to regulate the output of the polyphase generator with a field control signal, wherein the field control signal is based on summing the total ripple signal and a reference voltage.

Example 2 is the system of example 1, comprising: a regulator configured to receive a control signal comprising a sum of the total ripple signal and the reference voltage and to output the field control signal to regulate the output of the polyphase generator.

Example 3 is the system of example 2, wherein the regulator comprises: a semiconductor switching device configured to output the field control signal to the polyphase generator by transitioning between an on-state and an off-state.

Example 4 is the system of example 3, wherein transitioning the semiconductor switching device between the on-state and the off-state controls a duty cycle and a frequency of the field control signal.

Example 5 is the system of examples 1-4, comprising: a first diode coupled between the generator regulation feedback loop and ground; and a second diode arranged in an opposite orientation from the first diode and coupled between the generator regulation feedback loop and the ground, wherein a voltage of the total ripple signal is maintained between a first threshold voltage of the first diode and a second threshold voltage of the second diode.

Example 6 is the system of examples 1-5, comprising: a first decoupling capacitor configured to decouple the positive rectified ripple signal from the polyphase bridge rectifier; and a second decoupling capacitor configured to decouple the negative rectified ripple signal from the polyphase bridge rectifier.

Example 7 is the system of examples 1-6, wherein the polyphase generator generates a three-phase output.

Example 8 is the system of examples 1-7, comprising: a first conditioning filter configured to filter the positive rectified ripple signal; and a second conditioning filter configured to filter the negative rectified ripple signal, wherein the positive rectified ripple signal and the negative rectified ripple signal are filtered prior to producing the total ripple signal.

Example 9 is the system of examples 1-8, wherein the generator regulation feedback loop controls a frequency of the field control signal based on a frequency of the total ripple signal.

Example 10 is a method, comprising: providing an output of a polyphase generator to a polyphase bridge rectifier; outputting from the polyphase bridge rectifier a positive rectified ripple signal and a negative rectified ripple signal; summing the positive rectified ripple signal and the negative rectified ripple signal to produce a total ripple signal; generating a field control signal based on summing the total ripple signal and a reference voltage; and regulating the output of the polyphase generator with the field control signal.

Example 11 is the method of example 10, comprising: filtering the positive rectified ripple signal and the negative rectified ripple signal; and decoupling the positive rectified ripple signal and the negative rectified ripple signal from the polyphase bridge rectifier using a decoupling capacitor.

Example 12 is the method of examples 10-11, wherein generating the field control signal comprises generating a pulse width modulated control signal based on a frequency of the total ripple signal.

Example 13 is the method of examples 10-12, wherein regulating the output of the polyphase generator with the field control signal comprises regulating a duty cycle and a frequency of the field control signal.

Example 14 is the method of example 13, wherein regulating the duty cycle and the frequency of the field control signal comprises alternating a semiconductor switching device between an on-state and an off-state.

Example 15 is the method of examples 10-14, comprising: providing the total ripple signal via a feedback control loop to a regulator that generates the field control signal.

Example 16 is a system, comprising: a polyphase generator; a polyphase bridge rectifier electrically coupled to an output of the polyphase generator, wherein the polyphase bridge rectifier is configured to output a positive rectified ripple signal and a negative rectified ripple signal; a first conditioning filter configured to filter the positive rectified ripple signal to output a filtered positive rectified ripple signal; a second conditioning filter configured to filter the negative rectified ripple signal to output a filtered negative rectified ripple signal, wherein the filtered positive rectified ripple signal and the filtered negative rectified ripple signal are summed to output a total ripple signal; and a regulator configured to control the output of the polyphase generator with a field control signal based on summing of the total ripple signal and a reference voltage.

Example 17 is the system of example 16, comprising: a feedback control loop configured to provide the total ripple signal to the regulator.

Example 18 is the system of example 17, comprising: a first diode coupled between the feedback control loop and ground; and a second diode arranged in an opposite direction from the first diode and coupled between the feedback control loop and the ground, wherein a voltage of the total ripple signal is maintained between a first threshold voltage of the first diode and a second threshold voltage of the second diode.

Example 19 is the system of examples 16-18, comprising: a first decoupling capacitor configured to decouple the positive rectified ripple signal from the polyphase bridge rectifier; and a second decoupling capacitor configured to decouple the negative rectified ripple signal from the polyphase bridge rectifier.

Example 20 is the system of examples 16-20, wherein the field control signal is a pulse width modulated control signal generated by transitioning a field metal-oxide-semiconductor field-effect transistor between an on-state and an off-state.

Different arrangements of the components depicted in the drawings or described above, as well as components and steps not shown or described are possible. Similarly, some features and sub-combinations are useful and may be employed without reference to other features and sub-combinations. Embodiments of the present subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A system, comprising:
a polyphase generator;
a polyphase bridge rectifier electrically coupled to an output of the polyphase generator, wherein the polyphase bridge rectifier is configured to output a positive rectified ripple signal with respect to a ground voltage and a negative rectified ripple signal with respect to the ground voltage, wherein the positive rectified ripple signal and the negative rectified ripple signal are summed to produce a total ripple signal; and
a generator regulation feedback loop configured to regulate the output of the polyphase generator with a field control signal, wherein the field control signal is based on summing the total ripple signal and a reference voltage.

2. The system of claim 1, comprising:
a regulator configured to receive a control signal comprising a sum of the total ripple signal and the reference voltage and to output the field control signal to regulate the output of the polyphase generator.

3. The system of claim 2, wherein the regulator comprises:
a semiconductor switching device configured to output the field control signal to the polyphase generator by transitioning between an on-state and an off-state.

4. The system of claim 3, wherein transitioning the semiconductor switching device between the on-state and the off-state controls a duty cycle and a frequency of the field control signal.

5. The system of claim 1, comprising:
a first diode coupled between the generator regulation feedback loop and ground; and
a second diode arranged in an opposite orientation from the first diode and coupled between the generator regulation feedback loop and the ground, wherein a voltage of the total ripple signal is maintained between a first threshold voltage of the first diode and a second threshold voltage of the second diode.

6. The system of claim 1, comprising:
a first capacitor configured to reduce noise on the positive rectified ripple signal; and
a second capacitor configured to reduce noise on the negative rectified ripple signal.

7. The system of claim 1, wherein the polyphase generator generates a three-phase output.

8. The system of claim 1, comprising:
a first conditioning filter configured to filter the positive rectified ripple signal; and
a second conditioning filter configured to filter the negative rectified ripple signal,
wherein the positive rectified ripple signal and the negative rectified ripple signal are filtered prior to producing the total ripple signal.

9. The system of claim 1, wherein the generator regulation feedback loop controls a frequency of the field control signal based on a frequency of the total ripple signal.

10. A method, comprising:
providing an output of a polyphase generator to a polyphase bridge rectifier;
outputting from the polyphase bridge rectifier a positive rectified ripple signal with respect to a ground voltage and a negative rectified ripple signal with respect to the ground voltage;
summing the positive rectified ripple signal and the negative rectified ripple signal to produce a total ripple signal;
generating a field control signal based on summing the total ripple signal and a reference voltage; and
regulating the output of the polyphase generator with the field control signal.

11. The method of claim 10, comprising:
filtering the positive rectified ripple signal and the negative rectified ripple signal; and
removing noise from the positive rectified ripple signal and the negative rectified ripple signal from the polyphase bridge rectifier using a capacitor.

12. The method of claim 10, wherein generating the field control signal comprises generating a pulse width modulated control signal based on a frequency of the total ripple signal.

13. The method of claim 10, wherein regulating the output of the polyphase generator with the field control signal comprises regulating a duty cycle and a frequency of the field control signal.

14. The method of claim 13, wherein regulating the duty cycle and the frequency of the field control signal comprises alternating a semiconductor switching device between an on-state and an off-state.

15. The method of claim 10, comprising:
providing the total ripple signal via a feedback control loop to a regulator that generates the field control signal.

16. A system, comprising:
a polyphase generator;
a polyphase bridge rectifier electrically coupled to an output of the polyphase generator, wherein the polyphase bridge rectifier is configured to output a positive rectified ripple signal with respect to a ground voltage and a negative rectified ripple signal with respect to the ground voltage;
a first conditioning filter configured to filter the positive rectified ripple signal to output a filtered positive rectified ripple signal;
a second conditioning filter configured to filter the negative rectified ripple signal to output a filtered negative rectified ripple signal, wherein the filtered positive rectified ripple signal and the filtered negative rectified ripple signal are summed to output a total ripple signal; and
a regulator configured to control the output of the polyphase generator with a field control signal based on summing of the total ripple signal and a reference voltage.

17. The system of claim 16, comprising:
a feedback control loop configured to provide the total ripple signal to the regulator.

18. The system of claim 17, comprising:
a first diode coupled between the feedback control loop and ground; and
a second diode arranged in an opposite direction from the first diode and coupled between the feedback control loop and the ground, wherein a voltage of the total ripple signal is maintained between a first threshold voltage of the first diode and a second threshold voltage of the second diode.

19. The system of claim 16, comprising:
a first decoupling capacitor configured to reduce noise on the positive rectified ripple signal; and
a second decoupling capacitor configured to reduce noise on the negative rectified ripple signal.

20. The system of claim 16, wherein the field control signal is a pulse width modulated control signal generated by transitioning a field metal-oxide-semiconductor field-effect transistor between an on-state and an off-state.

* * * * *